Sept. 20, 1955 V. WEBER ET AL 2,718,574
THERMOSTATIC CONTROL SWITCH
Filed Jan. 5, 1954 8 Sheets-Sheet 1
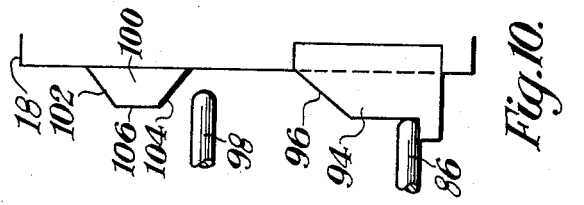
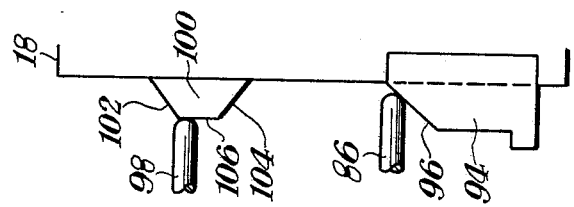
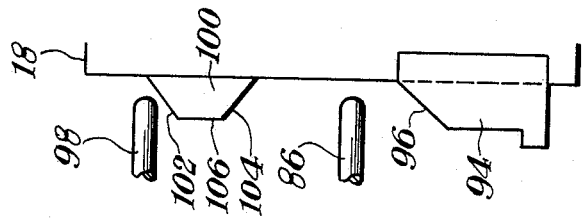
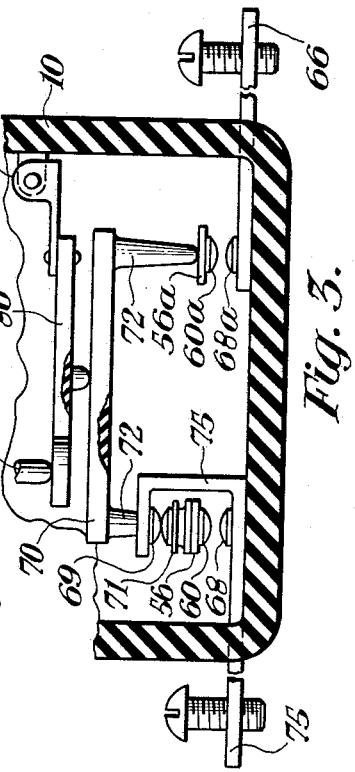
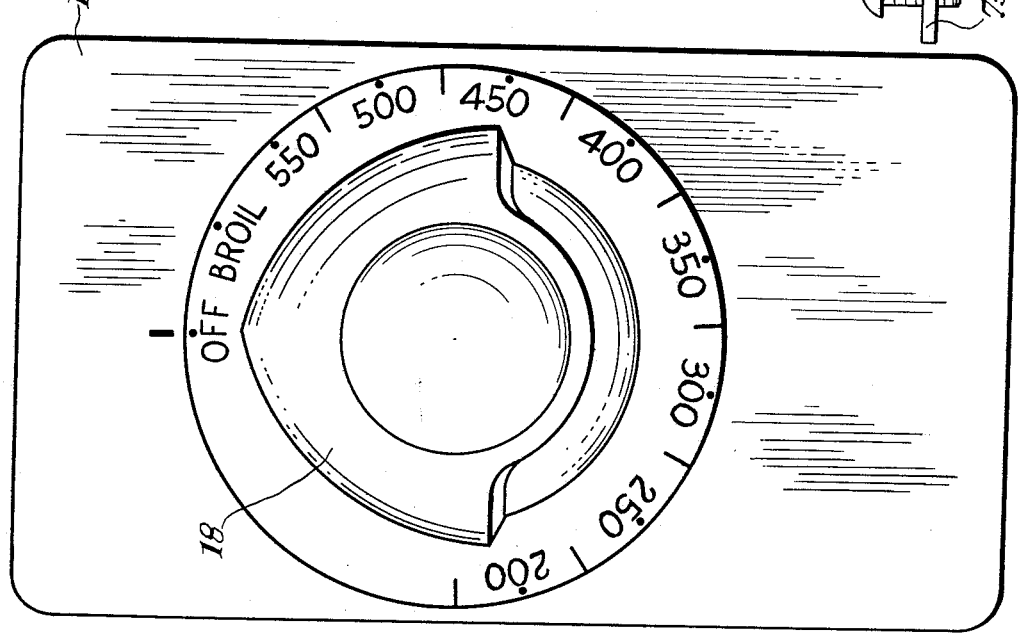
INVENTORS
*Victor Weber and
William J. Russell.*
BY
THEIR ATTORNEY Sept. 20, 1955  V. WEBER ET AL  2,718,574
THERMOSTATIC CONTROL SWITCH
Filed Jan. 5, 1954  8 Sheets-Sheet 2

INVENTORS
Victor Weber and
William J. Russell.
BY
Albert J. Henderson
THEIR ATTORNEY INVENTORS
Victor Weber and
William J. Russell.
BY
Albert J. Henderson
THEIR ATTORNEY Sept. 20, 1955  V. WEBER ET AL  2,718,574
THERMOSTATIC CONTROL SWITCH
Filed Jan. 5, 1954  8 Sheets-Sheet 5

INVENTORS
Victor Weber and
William J. Russell.
BY
THEIR ATTORNEY

INVENTORS
Victor Weber and
William J. Russell.
BY
THEIR ATTORNEY

Sept. 20, 1955                V. WEBER ET AL                2,718,574
                        THERMOSTATIC CONTROL SWITCH
Filed Jan. 5, 1954                                    8 Sheets-Sheet 7

INVENTORS
Victor Weber and
William J. Russell.
BY
THEIR ATTORNEY

United States Patent Office 2,718,574
Patented Sept. 20, 1955

2,718,574

THERMOSTATIC CONTROL SWITCH

Victor Weber, Greensburg, and William J. Russell, Jeannette, Pa., assignors to Robertshaw-Fulton Controls Company, Greensburg, Pa., a corporation of Delaware Application January 5, 1954, Serial No. 402,342

10 Claims. (Cl. 200—140)

This invention relates to thermostatic control switches and, more particularly, to control switches for electrically heated ovens provided with baking and broiling elements.

In ovens of this kind, it is customary to provide a main switch controlled by a thermostat and separate control switches for the heating elements so that these can be individually controlled. An object of the present invention is to retain the operating features of prior controls while simplifying the construction by utilizing switch parts common to both heating elements. A preferred embodiment includes switch arms, one of which carries a contact bridge and which are normally biased to a position for energizing one of the heating elements at full voltage and the other of the heating elements at half voltage. When the switch arms are moved to another position, the one heating element is deenergized and the switch arms are positioned for energizing the other heating element. In the former instance, the heating elements are under the control of the main thermostatic switch to maintain a desired oven temperature for baking purposes.

Another object of this invention is to open the main thermostatic switch whenever the switch arms of the other switches are moving between their controlling positions so that no load is carried by the switch arms while they are making or breaking a circuit.

Another object of this invention is to prevent arcing at the contacts of a control switch.

Another object of the invention is to avoid meticulous adjustment of the operating parts by yieldably mounting such parts for self-adjustment.

Another object of the invention is to facilitate assembly and disassembly of the control switch by housing the switch parts in a single casing interior.

Other objects and advantages will become apparent from the following description taken in connection with the accompanying drawings wherein:

Fig. 1 is a front elevation of a control switch embodying this invention;

Fig. 3 is a fragmentary sectional view taken on the line III—III of Fig. 1A;

Figs. 8, 9 and 10 are schematic developments of a detail showing various parts of the device in different operating positions.

Figure 1A:
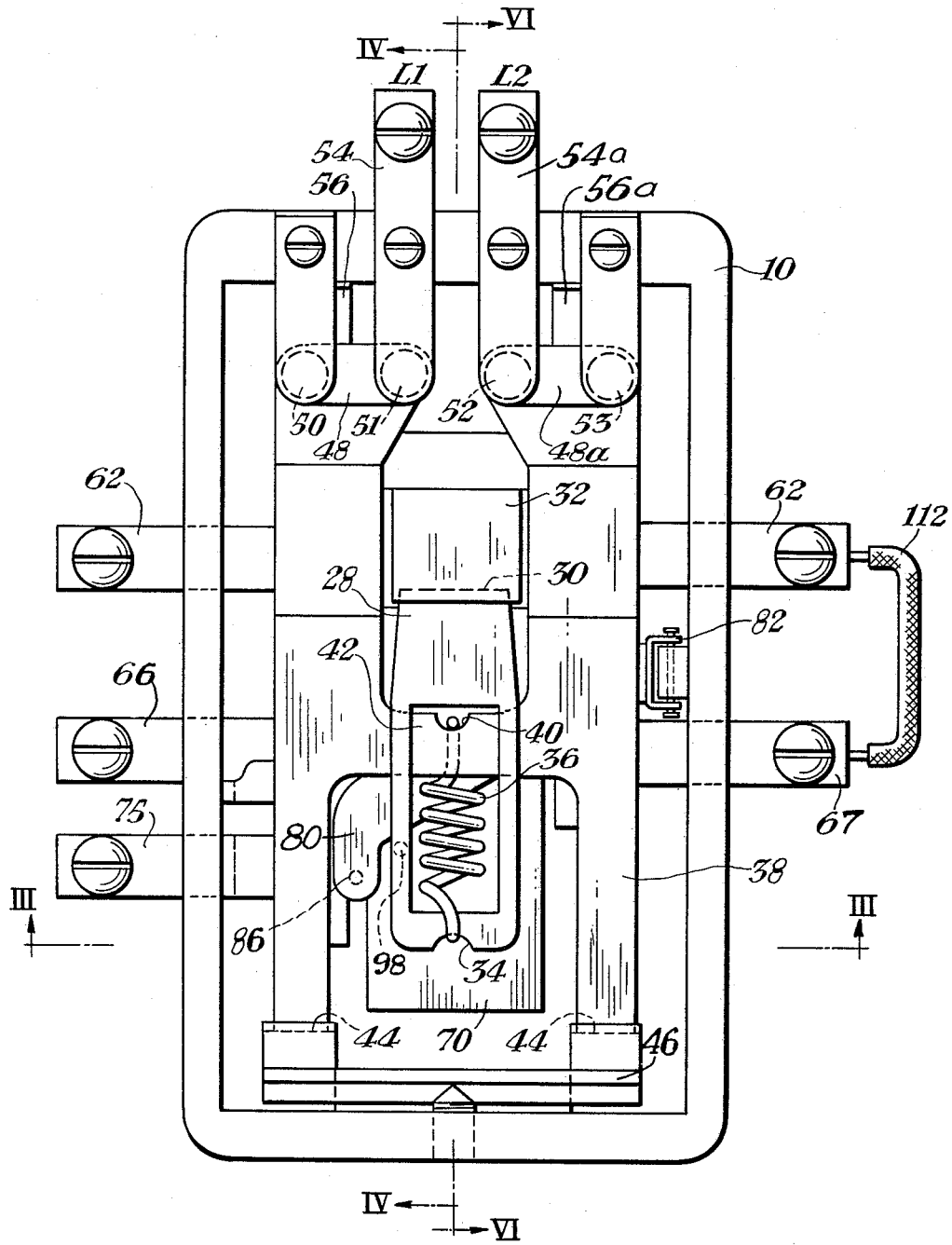
Fig. 1A is a view similar to that shown in Fig. 1 with the cover of the switch removed to illustrate the interior mechanism.
Figure 2:
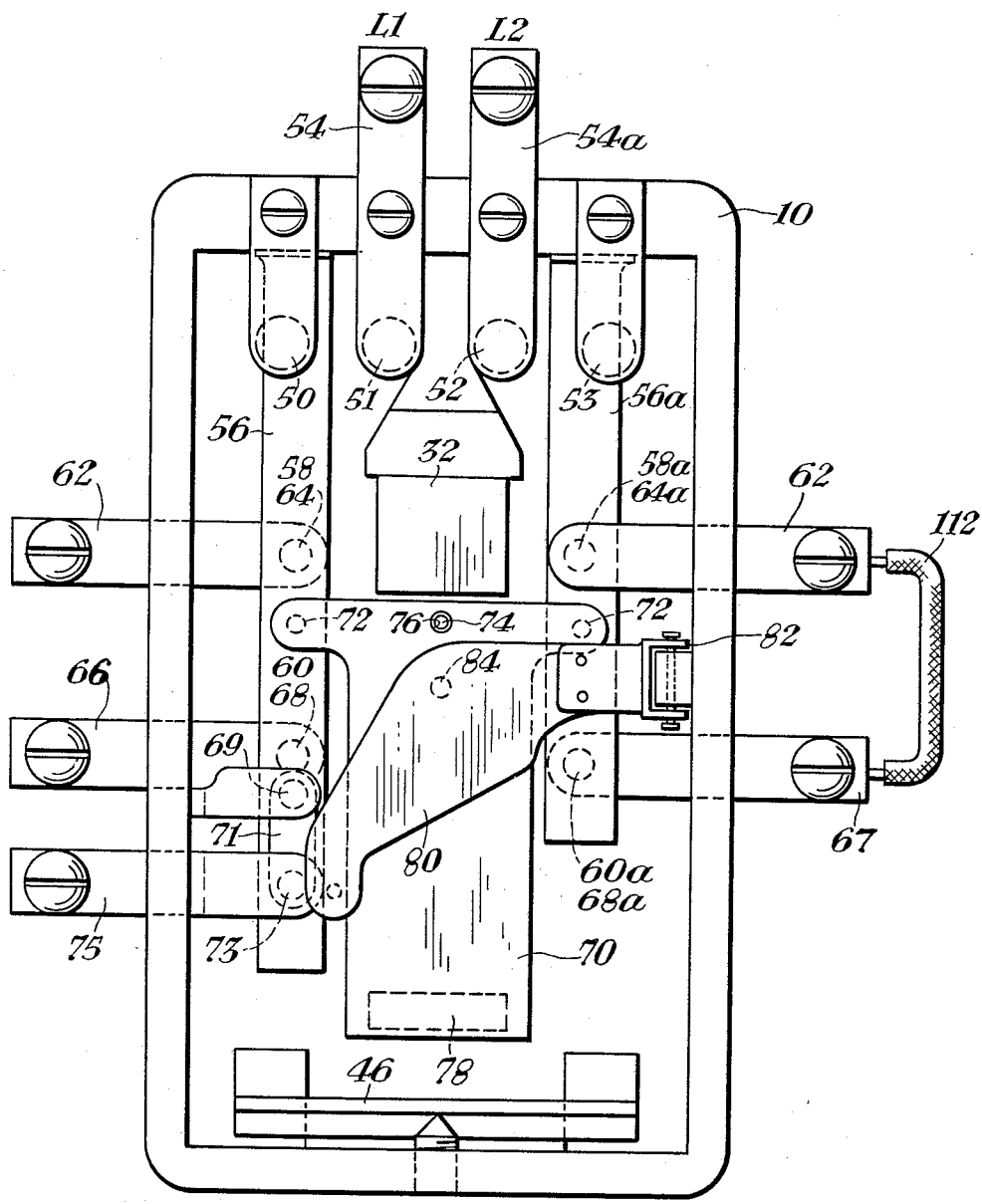
Fig. 2 is a view similar to that shown in Fig. 1A with the parts of the switch removed to illustrate the interior mechanism.

Referring more particularly to the drawings, a cup-shaped casing 10 of insulating material is provided with a cover 12 for the open end thereof, the cover 12 carrying a centrally disposed bushing 14. An adjusting screw 16, preferably provided with left-hand threads, is cooperable with the bushing 14 and carries on its exterior end the usual handle 18 by means of which the adjusting screw 16 can be rotated.

Temperature responsive means in the form of an expansible and contractible diaphragm element 20 is carried on the interior end of the adjusting screw 16 and has an operating button 22 projecting therefrom. The interior of the diaphragm element 20 is in communication with a capillary tube 24 which extends exteriorly of the cover 12 for communication with the usual bulb element 25 to be located in an oven. The temperature responsive device comprising the diaphragm unit 20, capillary tube 24 and bulb element 25 is charged with a suitable thermal fluid which will increase pressure within the diaphragm element 20 when the bulb 25 is heated, such increase in pressure being effective to expand the diaphragm unit 20 sufficiently to operate the parts now to be described.

The button 22 extends into a depression 26 formed in the face of a main actuating lever 28 of a snap-action means. The main actuating lever 28 is provided at one end with a knife edge 30 which is cooperable with a support 32 projecting from the casing 10. The opposite end of the main actuating lever 28 is also provided with a knife edge 34 around which one end of a coil spring 36 is hooked.

A main control lever 38 of generally H-shaped configuration is provided with a knife edge 40 formed in the center bar 42 thereof for receiving the opposite hooked end of the coil spring 36. The lower legs of the control lever 38 are each provided with a knife edge 44 for cooperation with suitable bearings formed on an adjustable bridge element 46 supported in the casing 10. The upper legs of the control lever 38 are insulated from the lower legs and each carries a double pole contact bridge 48, 48a for cooperation with pairs of fixed contacts 50, 51 and 52, 53 respectively. Each of these fixed contacts is carried on a suitable support extending into the casing 10, the supports for contacts 51 and 52 extending out of the casing 10 to form terminal connections 54, 54a for line wires L1, L2 respectively, as will be described more fully in connection with Fig. 11.

A pair of flexible switch arms 56, 56a is secured at one end to the contacts 50 and 53 respectively. The switch arms 56, 56a are formed of flexible material of an electrical conducting nature and extend rearwardly into the casing 10 for a portion of their length and thereafter extend substantially parallel with the control lever 38 of the snap-action means. The switch arm 56 carries a pair of contacts 58, 60 disposed on opposite sides thereof and spaced longitudinally one from the other. Likewise, the switch arm 56a carries a pair of contacts 58a, 60a. A pair of supports 62 project from opposite sides of the casing 10 respectively and carry relatively stationary or fixed contacts 64, 64a for cooperation with the contacts 58, 58a on the switch arms 56, 56a respectively. A second pair of supports 66, 67 project interiorly of the casing 10 and carry relatively stationary or fixed contacts 68, 68a for cooperation with the contacts 60, 60a on the switch arms 56, 56a respectively.

That portion of the switch arm 56 which extends beyond the contact 60 is formed of electrical insulating material and carries a contact bridge 71 thereon. The bridge 71 is movable with the switch arm 56 and is engageable with a pair of contacts 69, 73 to connect the same. The contact 69 is carried on the support 66 and the contact 73 is carried on a suitable support 75 which projects interiorly of the casing 10 adjacent the support 66.

Figure 4:
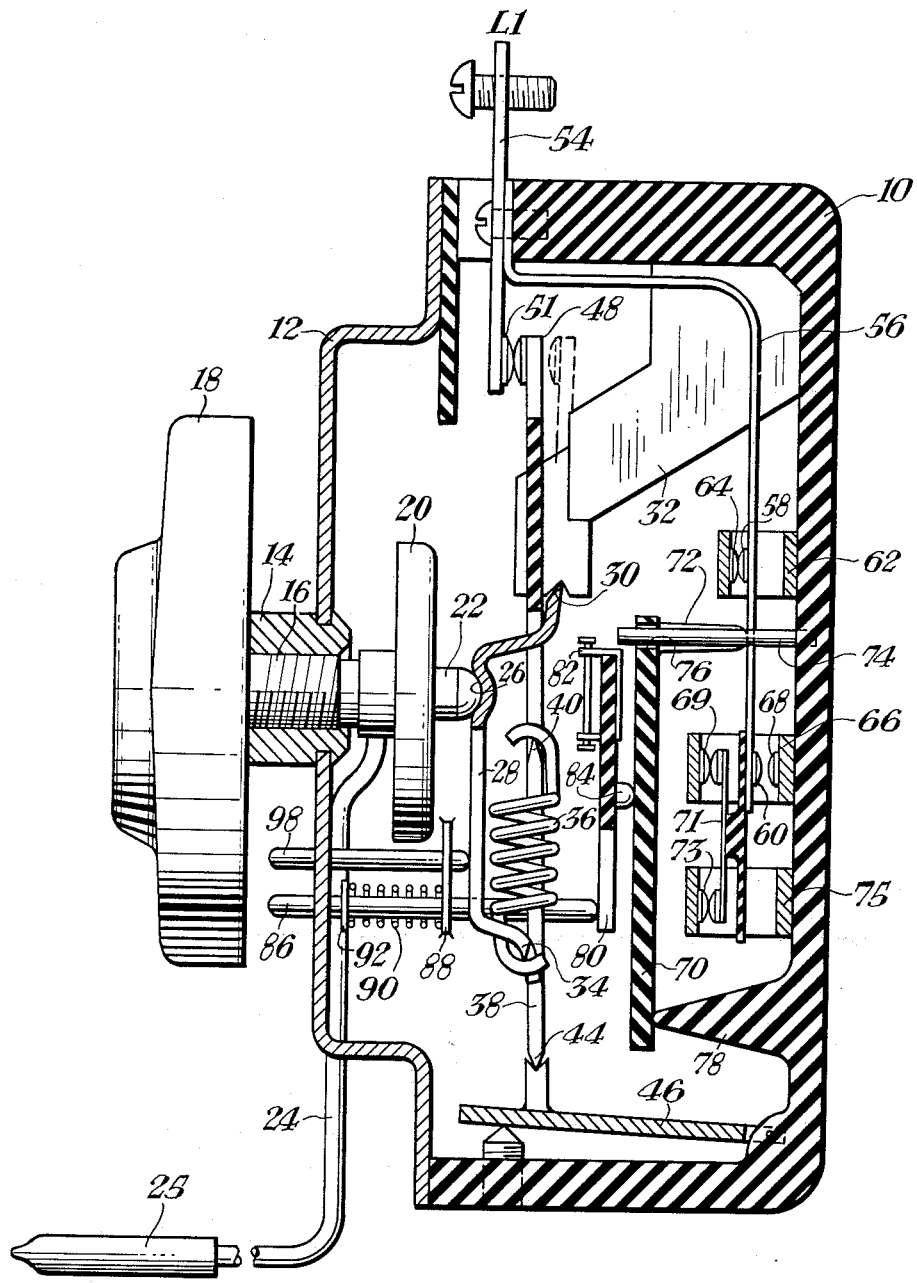
Fig. 4 is a sectional view taken on the line IV—IV of Fig. 1A.
Figure 5:
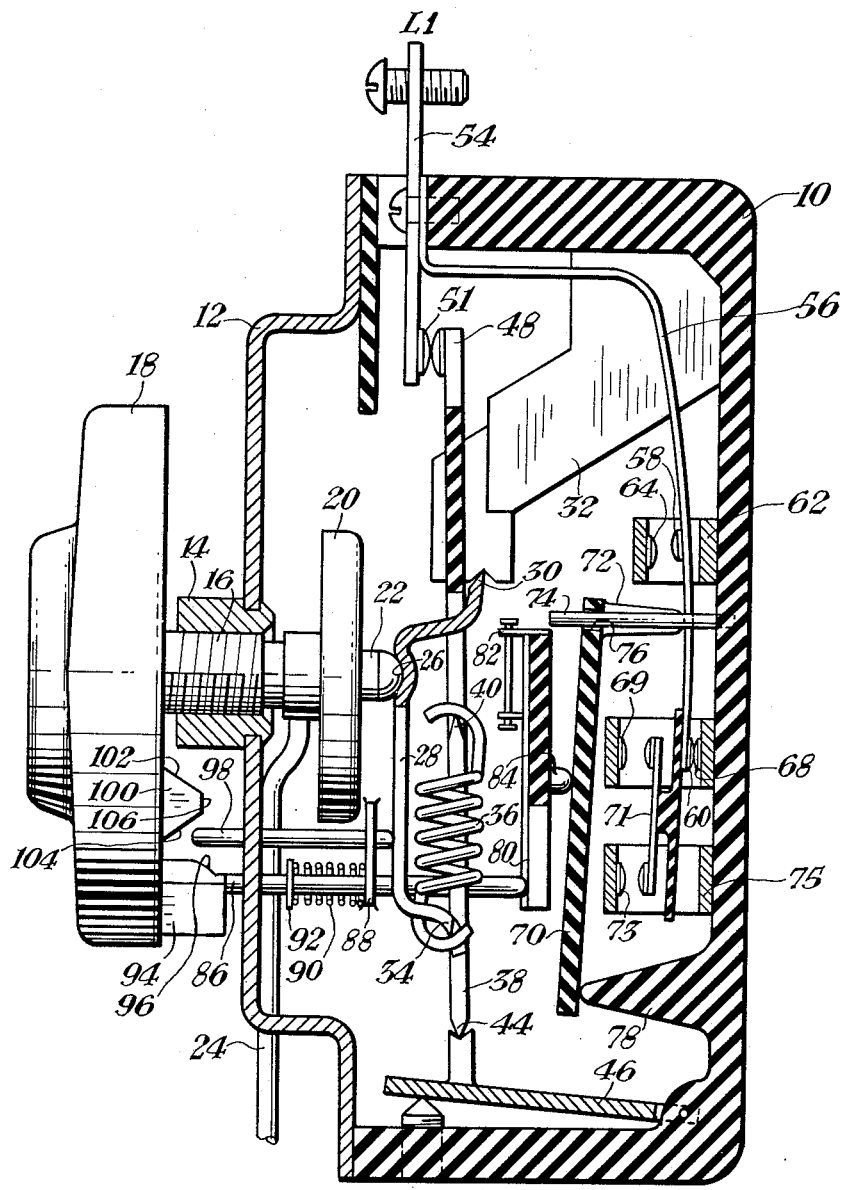
Fig. 5 is a view similar to that shown in Fig. 4, but with the various parts of the device shown in different operating positions.

The switch arm 56 has an inherent bias for closing the contacts 58, 64 and holding the bridge 71 in engagement with the contacts 69, 73 as well as for opening the contacts 60, 68 as shown in Fig. 4 of the drawings. The switch arm 56a is similar in that it has an inherent bias for closing the contacts 58a, 64a and opening the contacts 60a, 68a.

Means is provided for moving the flexible switch arms 56, 56a to open the contacts 58, 58a, 64, 64a, and 69, 73 and to close the contacts 60, 60a, 68, 68a. To this end, a toggle plate member 70 of insulating material is provided for movement toward and away from the flexible switch arms 56, 56a and has a pair of projections 72 which are operatively engageable with the switch arms 56, 56a respectively. The plate member 70 is mounted in a semi-floating manner in the casing 10 by the provision of a support pin 74 which projects from the casing between the switch arms 56, 56a and through an aperture 76 formed in that end of the plate 70 having the projections 72 thereon. Sufficient clearance exists between the pin 74 and the aperture 76 to provide for free slidable movement of the plate 70 toward the switch arms 56, 56a.

Figure 6:
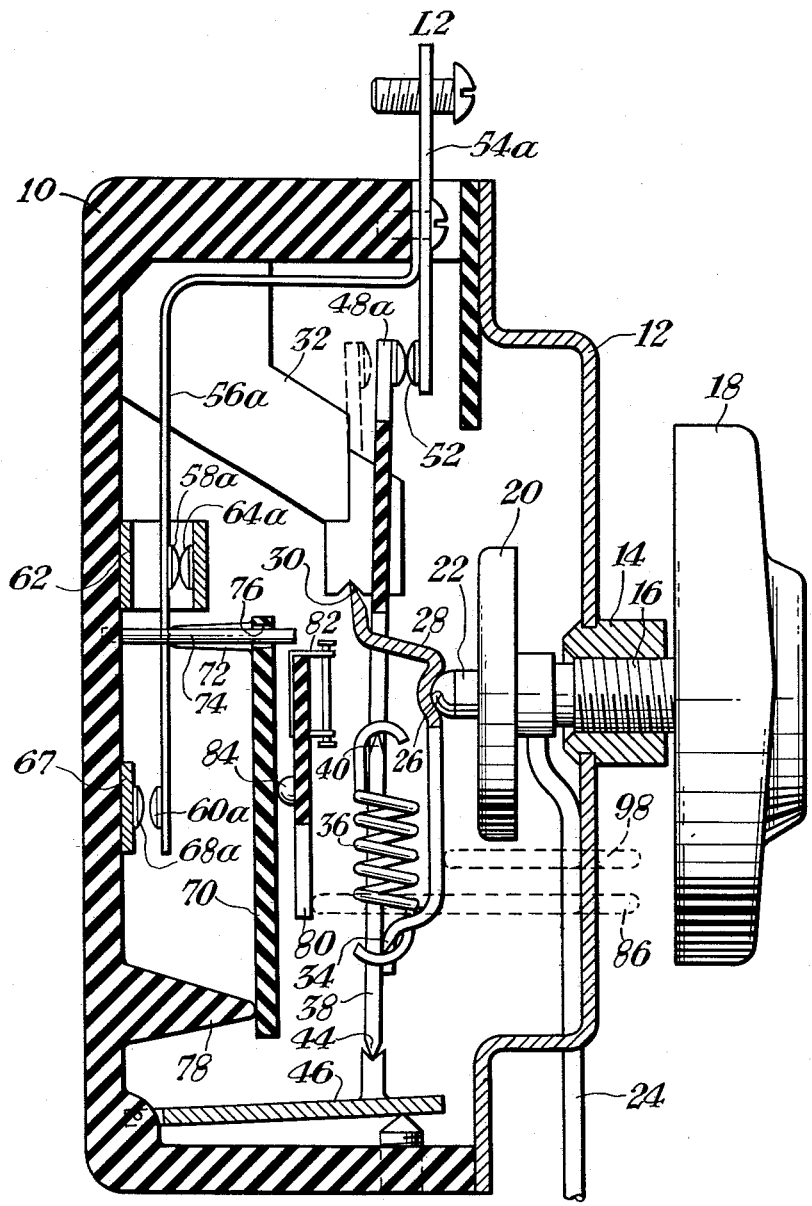
Fig. 6 is a sectional view taken on the line VI—VI of Fig. 1A.

In its initial or unoperated position, the plate 70 may occupy the position shown in Figs. 4 and 6 of the drawings, with the end opposite the projections 72 seated on a stop 78 which projects from the casing 10 into the path of movement of the plate 70.

Actuating means in the form of an operating lever 80 is provided for moving the plate 70 to its operative position. The lever 80 extends between the plate 70 and the snap-action means and is mounted at one end on a pivot 82 in the casing 10 on one side of the plate 70. Due to this arrangement, the lever 80 is movable in a path transverse to the path of movement of the plate 70. A projection 84 on the lever 80 engages the plate 70 at the median portion thereof for operating the same upon pivotal movement of the operating lever 80.

Manually operable means is provided for operating the lever 80 from the handle 18 and takes the form of a plunger 86 which projects through the cover 12 and through a suitable bearing 88 carried thereon into operative engagement with the free end of the lever 80. A coil spring 90 is operative between the bearing 88 and an abutment 92 carried on the plunger 86 for returning the latter to its initial position following manual operation.

Convenient means for operating the plunger 86 at an appropriate angle of rotation of the handle 18 may be provided by a cam element 94 carried on the handle 18 for this purpose. The cam element 94 is so positioned on the handle 18 that the plunger 86 will be operated whenever the handle 18 is rotated to the usual "broil" position, preferably beyond the range of temperature settings used in baking. The cam element 94 is provided with a sloping cam surface 96 which is disposed at an angle to the axis of the plunger 86. Thus, lateral movement of the cam element 94 upon rotation of the handle 18 when the plunger 86 is in engagement with the cam surface 96 will result in axial movement of the plunger 86 against the bias of the spring 90. Such axial movement of the plunger 86 will cause pivotal movement of the operating plate 80 and the toggle plate 70 to flex the switch arms 56, 56a, breaking contacts 58, 64, 58a, 64a and 69, 73 while engaging contacts 60, 68 and 60a, 68a.

To prevent arcing at the contacts 58, 64, 60, 68, 69, 73, 58a, 64a and 60a, 68a, manually operable means is provided for breaking the energizing circuit therefor when the switch arms 56, 56a are moving between the controlling positions. This means takes the form of a plunger 98 which projects through the cover 12 and through the bearing 88 into engagement with the main actuating lever 28 of the snap-action means. Means for operating the plunger 98 at an appropriate angle of rotation of the handle 18 is provided by a cam element 100 carried on the handle 18 for this purpose.

Figure 7:
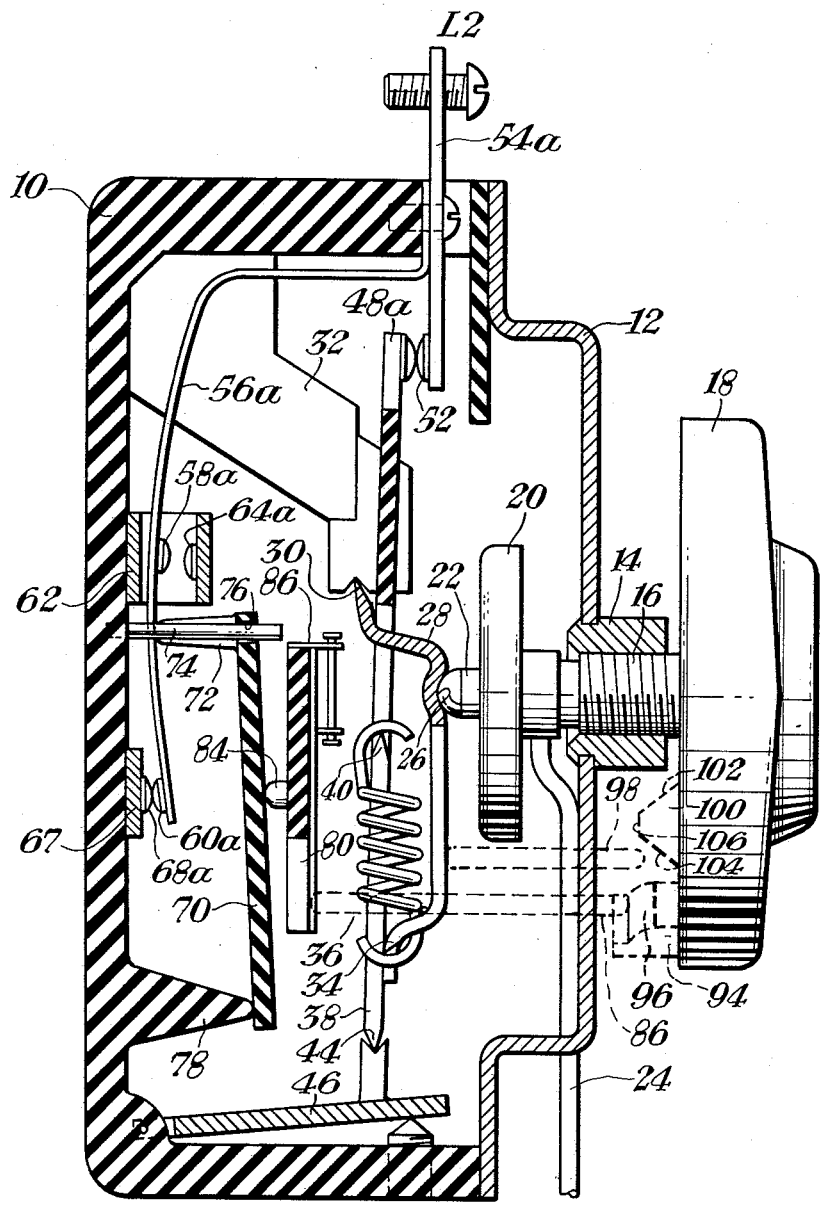
Fig. 7 is a view similar to that shown in Fig. 6 but with the various parts of the device shown in different operating positions.

The cam element 100 includes a pair of opposed cam surfaces 102, 104 each disposed at an angle to the axis of the adjusting screw 16 and separated by a third cam surface 106 disposed normal to the axis of the adjusting screw 16. As best shown in Figs. 8, 9 and 10, the cam element 100 is so located on the handle 18 that the plunger 98 will be engaged by the cam surface 102 upon rotation of the handle 18 in a clockwise direction, such engagement taking place prior to engagement of the plunger 86 with the cam surface 96. To clarify the mode of operation, the plungers 86, 98 and cams 94, 100 have been shown in broken lines as superimposed on the sectional views of Figs. 6 and 7.

Upon further rotation of the handle 18, the plunger 98 will ride up the cam surface 102 and along the cam surface 106 of the cam element 100. The plunger 98 will thus be forced inwardly of the casing 10 to move the main actuating lever 28 of the snap-action means about its pivot 30 and cause the main control lever 38 to snap over center to the broken line position shown in Figs. 4 and 6 thereby breaking contacts 50, 51, 48 and 52, 53, 48a.

When the plunger 98 is in engagement with the cam surface 106, the handle 18 is positioned to place the plunger 86 in engagement with the cam surface 96, the cam surface 106 being of sufficient length to assure retention of the plunger 98 in its innermost position and the open position of the contacts carried by the main control lever 38 whenever the cam surface 96 and plunger 86 are cooperating to move the switch arms 56, 56a between their controlling positions.

However, the cam surface 106 terminates at a point that permits the plunger 98 to slide down the cam surface 104 to cause closing of the contacts carried by the main operating lever 38 upon further movement of the handle 18 and after the switch arms 56, 56a have closed contacts 60, 68, 60a, 68a. Upon reverse movement of the handle 18, the plunger 98 will slide up the cam surface 104 to move the main control lever 38 to its contact opening position prior to breaking of the contacts 66, 68, 66a, 68a, the plunger 98 remaining in engagement with the cam surface 106 until after the cam surface 96 and plunger 86 have acted to close the contacts 58, 64, 58a, 64a and 69, 73.

*Operation*

Figure 11:
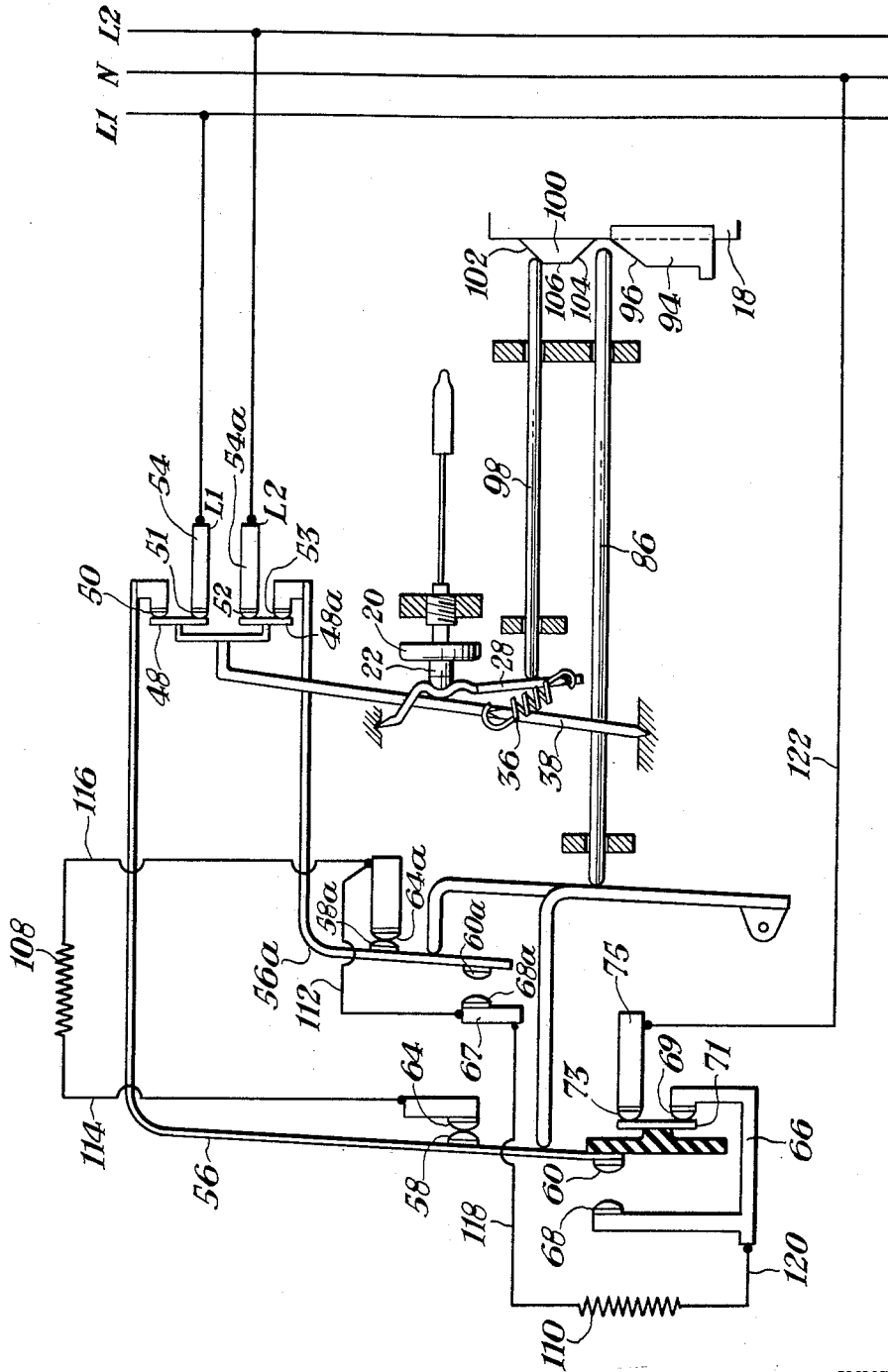
Fig. 11 is a schematic showing of the switch of Figs. 1 through 10 and the electrical connections thereto.

Referring more particularly to Fig. 11 of the drawings, the usual bake element 108 is shown as being connected to the fixed contacts 64, 64a and the broil element 110 to the fixed contacts 68, 68a. The fixed contacts 64a, 68a are connected through an external jumper 112.

When the dial handle 18 is in the "off" position, the adjusting screw 16 is in its innermost position and the button 22 will have caused the snap-action mechanism to hold the control lever 38 in the broken line shown in Figs. 4 and 6 with the contact bridges 48, 48a in open position. When the handle 18 is rotated clockwise to any temperature setting, except broil, then the adjusting screw 16 of the diaphragm 20 will move away from the main actuating lever 28 of the snap-action means, allowing the control lever 38 to snap to the full line position shown in Fig. 4. In such position, the contact bridges 48, 48a are closed.

As the contacts 58, 64, 58a, 64a, 69, 73 controlling the bake and broil elements 108, 110 are initially closed due to the inherent bias of the flexible switch arms 56, 56a, then current will flow to the bake element 108 by way of line wire L1, terminal 54, fixed contact 51, contact bridge 48, fixed contact 50, switch arm 56, contacts 58, 64, wire 114, bake element 108, wire 116, contacts 58a, 64a, switch arm 56a, fixed contact 53, contact bridge 48a, fixed contact 52, and terminal 54a to the line wire L2. The bake element 108 is thus connected across the power source at full voltage.

At the same time, the broil element 110 is connected to the power source to be energized at half voltage through a circuit which may be traced as follows: from line wire L2 to terminal 54a, fixed contact 52, contact bridge 48a, fixed contact 53, switch arm 56a, contacts 58a, 64a, jumper 112, contact support 67 of contact 68a, wire 118, broil element 110, wire 120, contact support 66, fixed contact 69, contact bridge 71, fixed contact 73, contact support 75, and wire 122 to neutral wire N of the three-wire power source.

When the diaphragm 20 expands at the predetermined temperature set by the handle 18, it will force the main actuating lever 28 away from the adjusting screw 16, causing the control lever 38 to snap to the broken line position shown in Figs. 4 and 6. Consequently, the circuits previously traced are broken by the main control switch and will remain broken until the diaphragm 20 again contracts to allow the main actuating lever 28 to move toward the adjusting screw 16 and repeat the operation.

When the handle 18 is rotated clockwise toward the "broil" position, the cam element 100 will engage the plunger 98 to move the main control lever 38 to the broken line position shown in Figs. 4 and 6 and prevent energization of the bake and broil elements upon further movement of the handle 18 to bring the cam element 94 into engagement with the plunger 86. When the plunger 86 is engaged by the cam element 94, the plunger 86 will be moved inwardly of the casing 10 into engagement with the lever 80. The lever 80 is thereby rotated on its pivot 82 toward the plate 70 which immediately pivots about the stop 78 as a fulcrum. The projections 72 on the plate 70 now move the switch arms 56, 56a against their inherent bias away from the support 62 thus opening the contacts 58, 64, 58a, 64a, 69, 73. The switch arms 56, 56a are thereafter moved through a distance sufficient to close the contacts 60, 68, 60a, 68a. Further movement of the handle 18 will move the cam element 100 out of engagement with the plunger 98 to permit the main control lever 38 to return to its biased position wherein the contact bridges 48, 48a will close the contacts 50, 51 and 52, 53. It will be understood that the above described movement of the handle 18 to the "broil" position will move the adjusting screw 16 and disaphragm 20 away from the main actuating lever 28 of the snap-action mechanism to assure movement of the main control lever 38 to its biased position when the control force applied through the cam element 100 and plunger 98 is removed therefrom.

In the "broil" position of the handle 18, the circuit for the broil element 110 may be traced on Fig. 11 as follows: from line wire L1, terminal 54, contact 51, contact bridge 48, contact 50, switch arm 56, contacts 60, 68, wire 120, broil element 110, wire 118, contacts 68a, 60a, switch arm 56a, fixed contact 53, contact bridge 48a, fixed contact 52, and termnial 54a to line wire L2. The broil element 110 is thus connected to the power source at the full voltage of the same and will remain energized as long as the handle 18 remains in the "broil" position, unless the diaphragm 20 expands sufficiently to open the contact bridges 48, 48a as previously described.

Upon return of the handle 18 to the "off" position, the cam element 100 and plunger 98 will first act upon the snap-action mechanism to move the main control lever 38 to the broken line position with the cam element 94 thereafter moving out of engagement with the plunger 86 to permit the switch arms 56, 56a to return to their biased or initial positions. As the cam element 100 moves out of engagement with the plunger 98, the main control lever 38 will return to its biased position as shown in full lines in the drawings. However, further rotation of the handle 18 to the "off" position will cause the adjusting screw 16 and diaphragm 20 to move toward the snap-action mechanism through a distance sufficient to actuate the snap-action mechanism and cause the main control lever 38 thereof to assume the broken line position. Thus, the contact bridges 48, 48a will be opened and no current will flow to either the bake or broil elements, even though the bake contacts 58, 64, 58a, 64a and 69, 73 are now closed due to the inherent bias of the switch arms 56, 56a.

It will be apparent that no damage to the contacts carried by the switch arms 56, 56a can occur due to arcing since these switch arms carry no electrical load when contacts are being moved between controlling positions. It will also be apparent that, while a pair of flexible switch arms have been disclosed in this preferred embodiment, a similar result could be obtained by relatively rigid switch arms and yieldably mounted contacts. Such modifications together with other modifications in the details of construction and arrangements of parts may be made within the scope of the appended claims without departing from the invention.

It is claimed and desired to secure by Letters Patent:

1. A control device for electrically heated appliances comprising switch means movable between a plurality of positions for controlling a heating circuit, manually operable means for moving said switch means between said positions, an energizing circuit for connecting said switch means to a source of electric power, and switch means including a switch arm operatively associated with said manually operable means for breaking said energizing circuit and maintaining the same open while the first said switch means is moving between said positions.

2. A control device for electrically heated appliances comprising switch means movable between a plurality of positions for controlling a heating circuit, manually operable means for moving said switch means between said positions, an energizing circuit for connecting said switch means to a source of electric power, switch means in said energizing circuit and including a switch arm movable between open and closed positions, temperature responsive means for moving said switch arm between said positions, and means operatively associated with said manually operable means for holding said switch arm in said open position independently of said temperature responsive means while the first said switch means is moving between said positions.

3. A control device for electrically heated appliances comprising switch means movable between a plurality of positions for controlling a heating circuit, manually operable means for moving said switch means between said positions, an energizing circuit for connecting said switch means to a source of electric power, switch means in said energizing circuit including a switch arm movable between open and closed positions and biased to said closed position, snap-action means including a movable element for moving said switch arm to said open position when said element is moved to a predetermined position, temperature responsive means for moving said element to said predetermined position, and means operatively associated with said manually operable means for moving said element to said predetermined position independently of said temperature responsive means while the first said switch means is moving between said positions.

4. A control device for electrically heated appliances comprising switch means movable between a plurality of positions for controlling a heating circuit, an energizing circuit for connecting said switch means to a source of electric power, switch means in said energizing circuit and including a switch arm movable between open and closed positions, temperature responsive means for moving said switch arm between said positions, adjusting means for said temperature responsive means including a rotatable element, means operatively associated with said adjusting means for moving the first said switch means between said positions upon movement of said rotatable element between selected positions, and means operatively associated with said adjusting means for holding said switch arm in said open position independently of said temperature responsive means while said first switch means is moving between said positions thereof.

5. A control device for electrically heated appliances comprising switch means movable between a plurality of positions for controlling a heating circuit, an energizing circuit for connecting said switch means to a source of electric power, switch means in said energizing circuit including a switch arm movable between open and closed positions and biased to said closed position, snap-action means including a movable element for moving said switch arm to said open position when said element is moved to a predetermined position, temperature responsive means for moving said element to said predetermined position, adjusting means for said temperature responsive means including a rotatable element, means operatively associated with said adjusting means for moving the first said switch means between said positions upon movement of said rotatable element between selected positions, and means operatively associated with said adjusting means for holding said movable element in said predetermined position independently of said temperature responsive means while the first said switch means is moving between said positions.

6. A control device as claimed in claim 5 wherein said last named means includes a reciprocable member operatively engageable with said movable element and cam means movable with said rotatable element for actuating said member.

7. A control device as claimed in claim 6 wherein said means for moving said first switch means includes a reciprocable member operatively associated therewith and cam means movable with said rotatable element for actuating said last named member.

8. A switch device comprising at least four relatively stationary contacts, a switch arm of conductive material biased into engagement with one of said contacts, a contact bridge carried on said switch arm and insulated therefrom, said contact bridge engaging a second and third of said contacts in the biased position of said switch arm, and a movable member operatively engageable with said switch arm for moving the same against its bias and into engagement with the fourth of said contacts, while at the same time disengaging said switch arm from said one contact and said contact bridge from said second and third contacts.

9. A control device for an electrically heated oven provided with bake and broil heating elements and having a three-wire power source, comprising a main switch, temperature responsive means for actuating said main switch, a plurality of relatively stationary contacts, a switch arm of conductive material connected to said main switch and biased into engagement with one of said contacts for energizing said bake element from said source at full voltage, a contact bridge carried on said switch arm and insulated therefrom, said contact bridge engaging a second and third of said contacts in the biased position of said switch arm for energizing said broil element from said source at a reduced voltage, and a movable member operatively engageable with said switch arm for moving the same against its bias and into engagement with a fourth of said contacts for energizing said broil element from said source at full voltage.

10. A control device as claimed in claim 9 wherein manually operable means is provided for actuating said movable member.

References Cited in the file of this patent

UNITED STATES PATENTS

| | | |
|---|---|---|
| 2,403,824 | Newell | July 9, 1946 |
| 2,542,088 | Krieger | Feb. 20, 1951 |